(12) United States Patent
Palmer, Jr. et al.

(10) Patent No.: US 6,390,761 B1
(45) Date of Patent: May 21, 2002

(54) TELESCOPIC RAMP

(76) Inventors: John M. Palmer, Jr., P.O. Box 115, Lutz, FL (US) 33548; John M. Palmer, III, 6444 E. Mockingbird, Dallas, TX (US) 75214; Evelyn C. Martinez, 2771 Summerdale Dr. N., #11, Clearwater, FL (US) 33761

( * ) Notice: Subject to any disclaimer, the term of this patent is extended or adjusted under 35 U.S.C. 154(b) by 0 days.

(21) Appl. No.: 09/563,735

(22) Filed: May 3, 2000

Related U.S. Application Data

(60) Provisional application No. 60/133,409, filed on May 10, 1999.

(51) Int. Cl.[7] .................................................. B60P 1/43
(52) U.S. Cl. ...................... 414/477; 414/480; 414/537
(58) Field of Search ............................... 414/462, 477, 414/478, 479, 480, 522, 537, 538

(56) References Cited

U.S. PATENT DOCUMENTS

| | | | | |
|---|---|---|---|---|
| 2,305,762 A | * | 12/1942 | Cristofoletti et al. | 414/538 |
| 3,550,801 A | | 12/1970 | Larson | 214/505 |
| 3,768,673 A | | 10/1973 | Nydam | 214/83.24 |
| 3,977,545 A | * | 8/1976 | Lloyd | 414/537 |
| 4,685,857 A | * | 8/1987 | Goeser et al. | 414/522 |
| 4,979,867 A | * | 12/1990 | Best | 414/537 |
| 5,046,913 A | * | 9/1991 | Domek et al. | 414/522 |
| 5,556,249 A | * | 9/1996 | Heine | 414/538 |
| 5,603,600 A | | 2/1997 | Egan | 414/462 |
| 5,829,945 A | * | 11/1998 | Stanley | 414/477 |
| 5,846,047 A | * | 12/1998 | Riekki | 414/478 |
| 5,915,773 A | * | 6/1999 | Deutsch et al. | 414/522 |
| 6,099,232 A | * | 8/2000 | Dixon et al. | 414/538 |
| 6,176,672 B1 | * | 1/2001 | Egan et al. | 414/462 |

FOREIGN PATENT DOCUMENTS

FR          2641743        *   7/1990   .................. 414/477

* cited by examiner

Primary Examiner—James W. Keenan

(57) ABSTRACT

An articulating, telescopic ramp for mounting on the top surface of the cargo bed of a truck, trailer or van. A base assembly 20 attaches to the cargo bed. A pivoting frame 40 is pivotally attached to the base assembly. A telescopic frame 60 is positioned on the pivoting frame so that it travels parallel to it. Lifting cylinders 46 attached to the forward end of the pivoting frame and to the forward end of the base assembly lift the forward end of the pivoting frame thus pivoting it relative to the base assembly. A pulling system 90 consisting of a rod less cylinder 93 and a traveling hub 92 is used for loading and unloading cargo on and off the ramp A modified tailgate 122 allows the ramp to reside and telescope forward and aft under it.

14 Claims, 7 Drawing Sheets

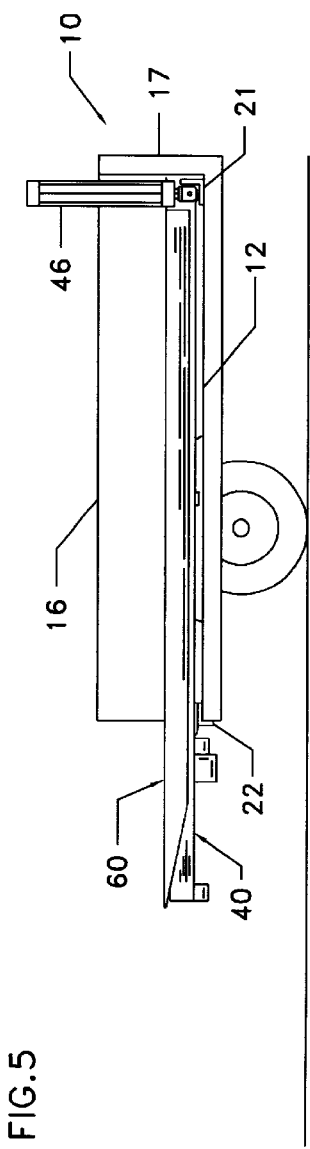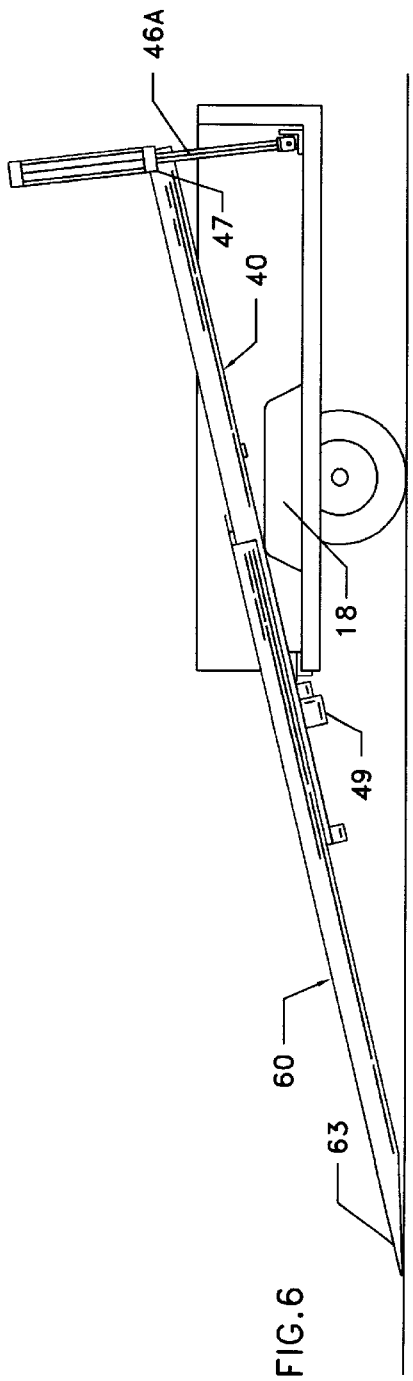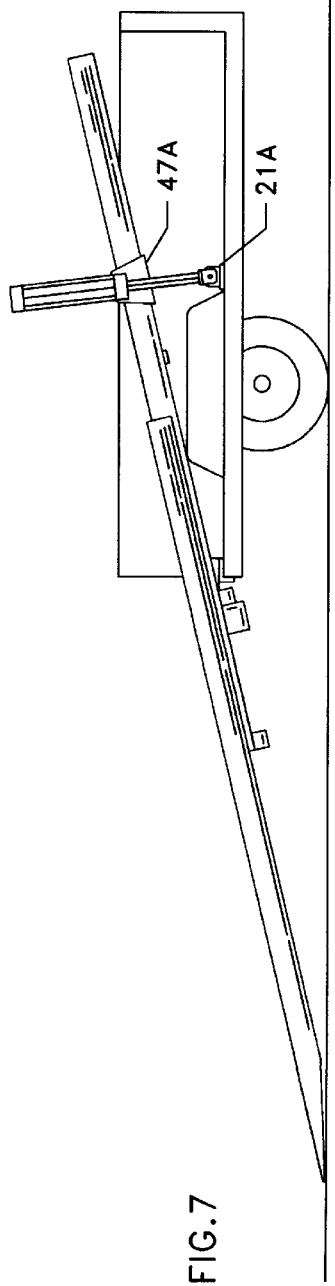

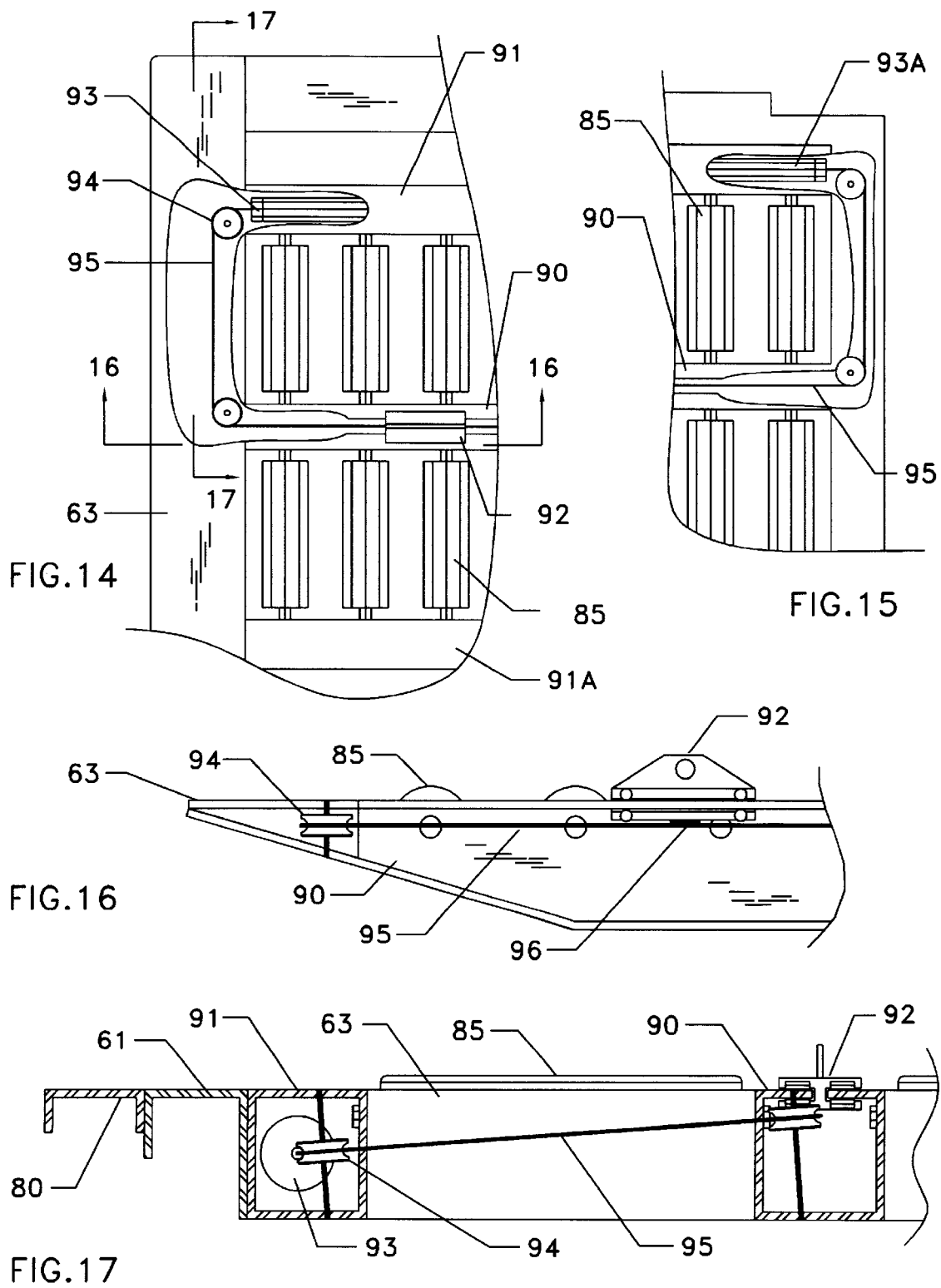

TELESCOPIC RAMP

Figure 1:
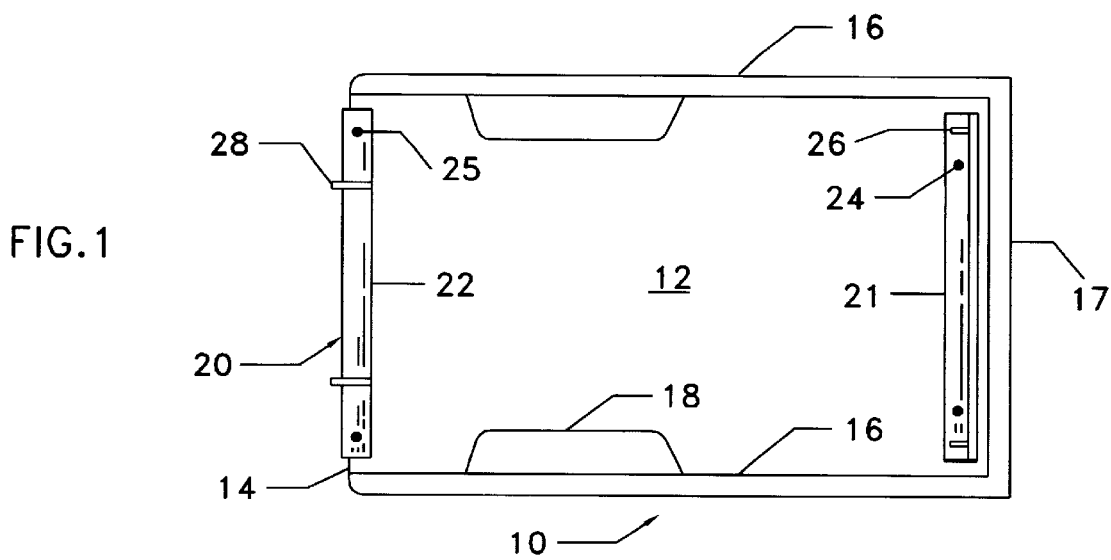

This application claims the benefit of 60/133,409, filed May 10, 1999.

BACKGROUND—FIELD OF INVENTION

This invention relates to ramps for loading and unloading trucks, trailers and vans, specifically to those ramps that pivot and telescope.

BACKGROUND—DESCRIPTION OF PRIOR ART

Over the years many systems have been developed in an effort to efficiently load items on and unload them off the cargo beds of trucks, trailers and vans. There have been various types of mechanical lifts, ramps, loading docks and other devices.

Trucks with ramps that tilt and telescope to the ground have been the most successful in fulfilling this job, however, most of these are attached directly to the vehicle's frame rather than on a cargo bed. U.S. Pat. 3,550,801 to Larson (1970) discloses a design that connects the ramp components to the framework of a truck that has no stationary cargo bed. U.S. Pat. 3,768,673 to Nydam et al (1973) discloses a system of limited capability. It is not powered in either its telescopic or pivoting functions. Their system shows the tailgate hinged in a downward position which is not possible with current tailgate design since the bumper would be in the way. U.S. Pat. No. 5,603,600 to Egan et al (1997) has elevated his system so that it will reside above a closed tailgate. Since the pivoting is not controlled while loading or unloading their system must be limited to light loads an operator can handle while at the same time working the winch.

OBJECTS AND ADVANTAGES

Several of the many objects and advantages of the present invention are:
(1) to provide a ramp which will reside on the cargo bed of a truck, trailer or van rather than being attached to the vehicle's frame and without major alterations to the cargo bed;
(2) to provide a ramp which will be primarily self contained and can be marketed as an easy to install package;
(3) to provide a ramp which will have most of its components installed within and above the cargo bed rather than under it;
(4) to provide a ramp which will have a minimum height so as to not consume a large volume of the cargo compartment;
(5) to provide a ramp which will have a gradual incline when pivoted down and extended to the ground;
(6) to provide a ramp for a pickup truck which will allow for a modified tailgate to be located in its normal location while allowing for the ramp to reside and telescope underneath;
(7) to provide a ramp for vehicles having wheel wells that allow for the main longitudinal structural members to reside between the wheel wells;
(8) to provide a ramp for a pickup truck which will allow for the main longitudinal structural members to reside between the wheel wells, but for the portion aft of the wheel wells to extend to almost the width of the tailgate, and aft of the tailgate to extend to any desired width;
(9) to provide a ramp which will allow for its top surface to be a combination of conventional conveyor devices and stationary deck materials;
(10) to provide a ramp which may have a powered pulling system for loading as well as a powered pushing system for unloading.

Further objects and advantages are to provide a ramp system that will allow an operator to still use those areas of the cargo bed not occupied by the ramp, and since the cargo bed is still intact small items that may fall from a retracted ramp will fall on the cargo bed rather than onto the ground. Still further objects and advantages will become apparent from a consideration of the ensuing description and drawings.

DRAWING FIGURES

In the drawings, closely related figures have the same number but different alphabetic suffixes.

Figure 2:
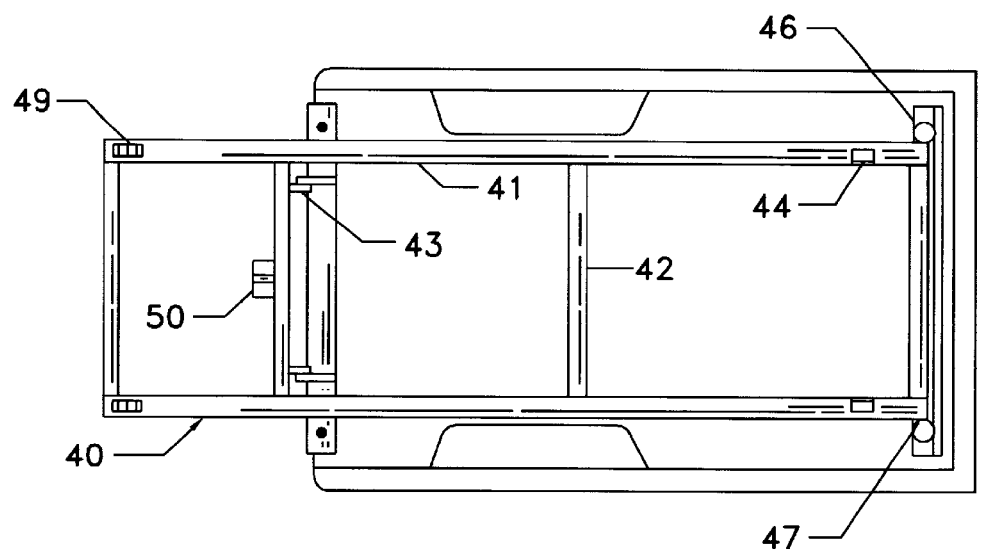
Figure 3:
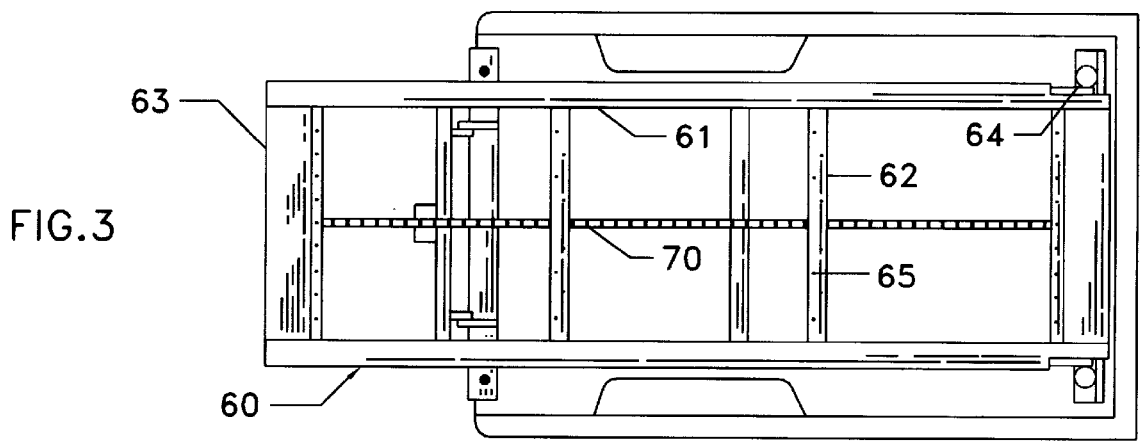

FIGS. 1 thru 3 show in plan view components of a ramp mounted in the cargo compartment of a vehicle having wheel wells that protrude through and above it's cargo bed.

Figure 4:
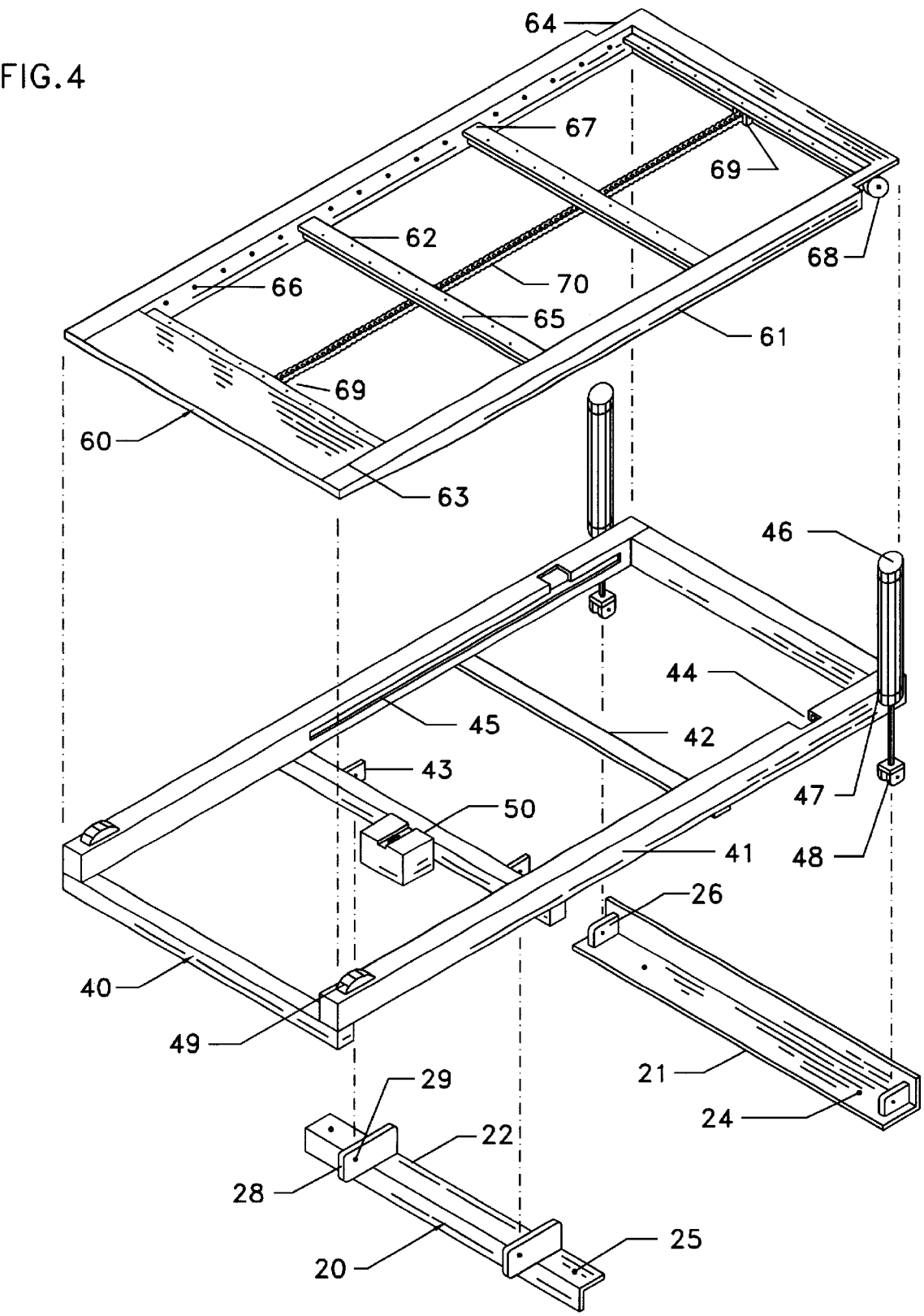

FIG. 4 shows an isometric exploded view of the components of the previous Figs.

FIGS. 5 thru 7 show in elevation views the ramps of the previous Figs but with the vehicles nearside sidewall removed.

FIGS. 8 thru 11 show in plan view various embodiments of the ramp's deck.

Figure 12:
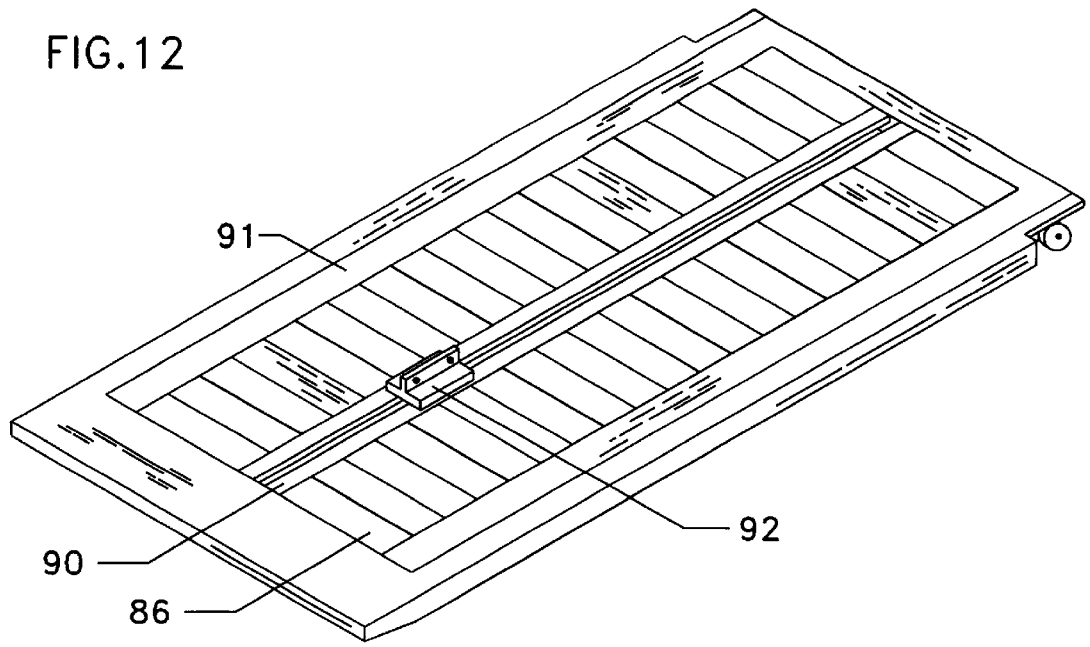
Figure 13:
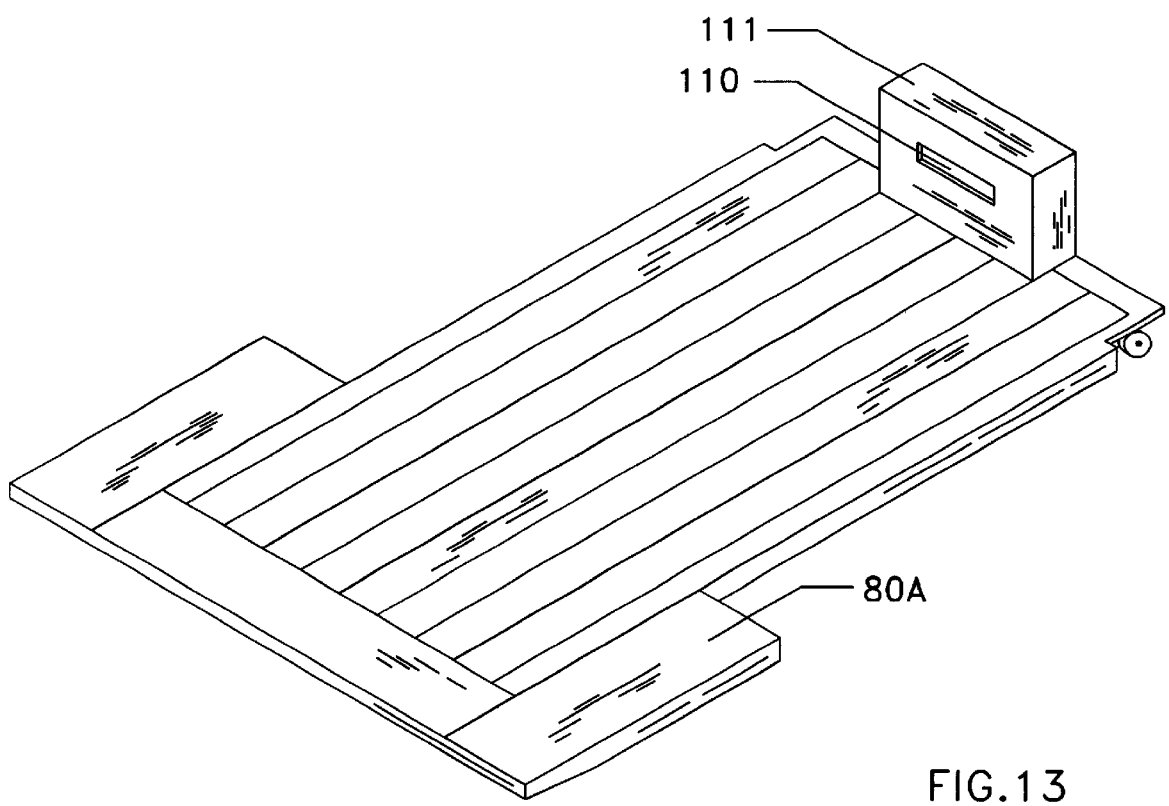
Figure 18:
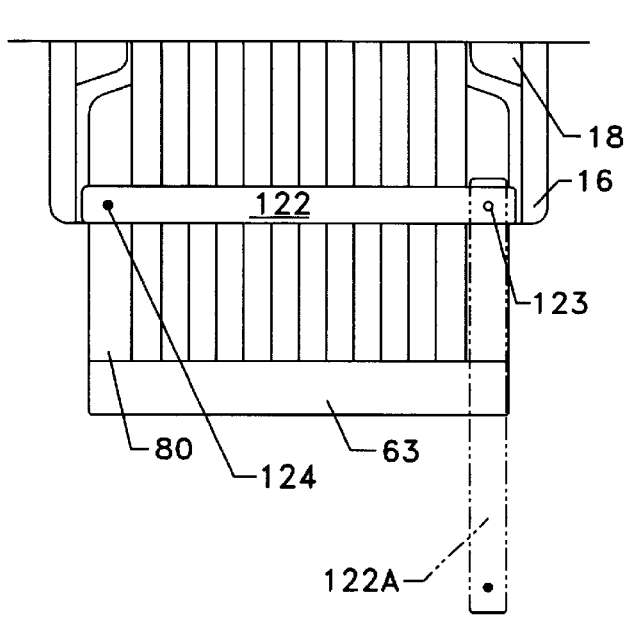
Figure 19:
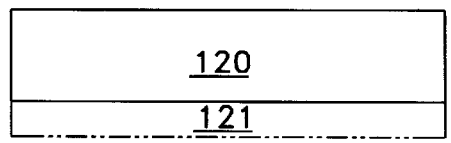
Figure 20:
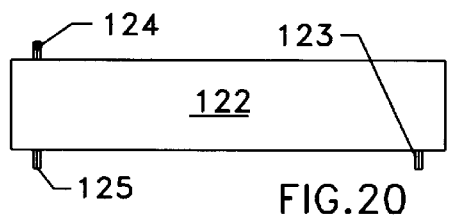
Figure 21:
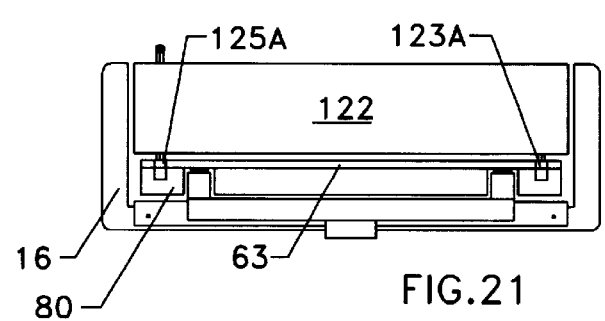
Figure 22:
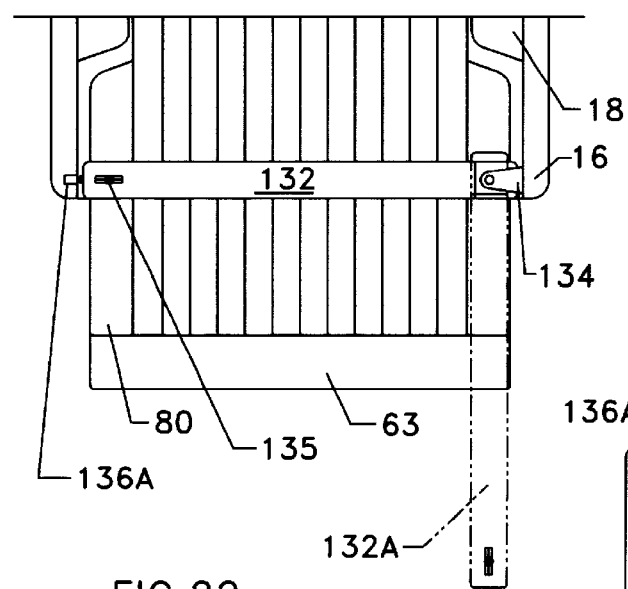
Figure 23:
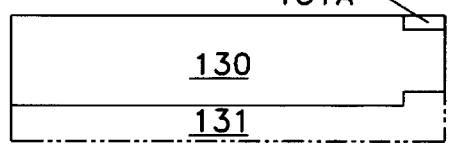
Figure 24:
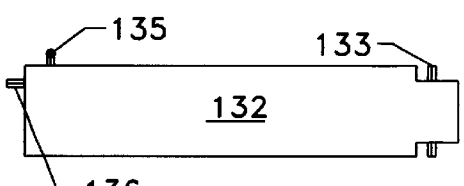
Figure 25:
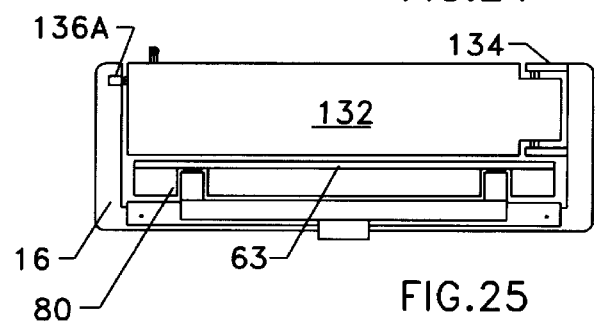

FIGS. 12 and 13 show in isometric view devices useful for loading and unloading a ramp.

FIGS. 14 thru 17 show in plan and sectional views details of a pulling device incorporating a rod less cylinder.

FIGS. 18 thru 25 shows in plan and elevation views modifications required for using a vehicle's original tailgate with a ramp.

REFERENCE NUMERALS IN DRAWINGS

| | |
|---|---|
| 10 cargo compartment | 20 base assembly |
| 40 pivoting frame | 80 telescopic frame |
| 80 deck embodiments | 90 pulling system |
| 110 winch system | 120 tailgate |

SUMMARY

In accordance with the present invention the ramp comprises a pivoting, telescopic system which mounts on the top surface of the cargo bed of trucks, trailers and vans.

DISCLOSURE

A typical embodiment 10 of the ramp of the present invention is illustrated in FIGS. 1 thru 3 showing a ramp mounted on the top of the cargo bed 12 of a vehicle having wheel wells 18 that protrude through its cargo bed and that has two sidewalls 16 and a forward wall 17. In FIG. 1 the base assembly 20 consist of a forward base 21 that is attached to the cargo bed with fasteners 24, and a rear base 22 attached to the rear of the cargo bed 14 with fasteners 25. Mounting bracket 26 receives clevis 48 (FIG. 4) and bracket 28 receives hinge bracket 43.

In FIG. 2 a pivoting frame assembly represented by 40 consist of longitudinal rails 41 that are separated by and connected to transverse members 42. The assembly is pivotally attached to rear base 22 with brackets 43 and 28. Notches 44 provide an access for track bearings 68 (FIG. 4) to enter rails 41. Bearings 49 are mounted in rails 41, with part of their outer surface disposed above rails 41 so that they may receive rails 61 (FIG. 3) that travel on them. 46 represent a system to raise the forward end of the frame. It could comprise hydraulic or pneumatic cylinders or linear actuators. 47 represents the point where the system pivotally attaches to the rails. 50 represents a device to pull a telescopic frame 60 (FIG. 3) longitudinally back and forth on frame 40.

In FIG. 3 a telescopic frame assembly represented by 60 consist of longitudinal rails 61 that are separated by and connected to transverse members 62 and 63. A notch 64 allows rails 61 to travel forward without contacting raising system 46. Holes 65 are provided for attaching deck materials. Chain 70 is connected to each end of frame 60 and underneath members 62. The chain is engaged with pulling device 50 providing a method for moving the telescopic frame back and forth. Other methods such as hydraulic or pneumatic cylinders or linear actuators would work as well.

FIG. 4 shows additional details of the parts of the previous Figs. Holes 29 represent the pivoting axis where brackets 28 and 43 connect. 67 represents the rigid connection of longitudinal rails 61 with transverse members 62. Slots 45 are cut in each of the 41 rails allowing for the axles of track bearings 68 to travel. Rod devises 48 connect lifting system 46 with brackets 26. Holes 66 are provided for receiving the axles of cylindrical conveyor rollers. Brackets 69 on each end of the telescopic frame provide a connection for each end of roller chain 70.

FIG. 5 shows the ramp in it's retracted condition with the vehicle's nearside sidewall removed. Base 21 is located dose to the forward end of the cargo bed.

FIG. 6 shows the ramp in it's extended and pivoted down position. It can be seen that the underside of member 63 is tapered so that the top surface of the deck is close to the ground. Wheel well 18 can be seen in the background.

FIG. 7 shows base 21A located close to the wheel well 18 and pivoting bracket 47A positioned above it. This location would be desirable if more uncluttered space forward is required.

Figure 8:
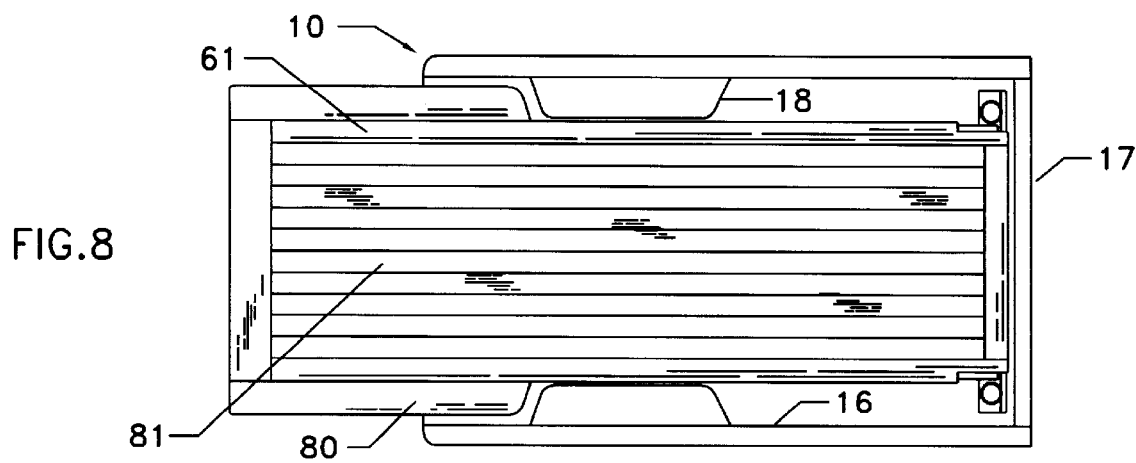

FIGS. 8 thru 13 show different deck embodiments. FIG. 8 shows the vehicle's wheel wells with the ramp between them. 80 represents the area aft of the wheel wells wider than that between the wheel wells and forward of them. 81 represents a stationary planked deck. It could be of wood, plastic, metal or some type of flexible material.

Figure 9:
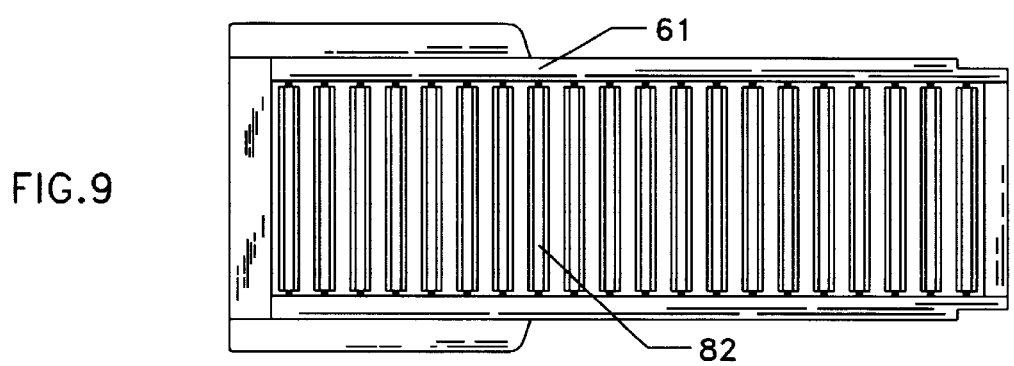
Figure 10:
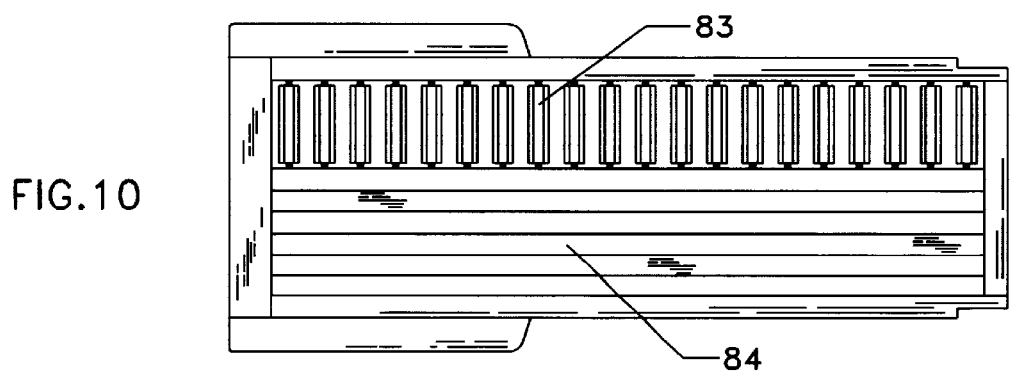

FIG. 9 shows an embodiment comprising cylindrical conveyor rollers 82 as the top surface of the ramp. FIG. 10 shows a combination of rollers 83 and stationary deck materials 84.

Figure 11:
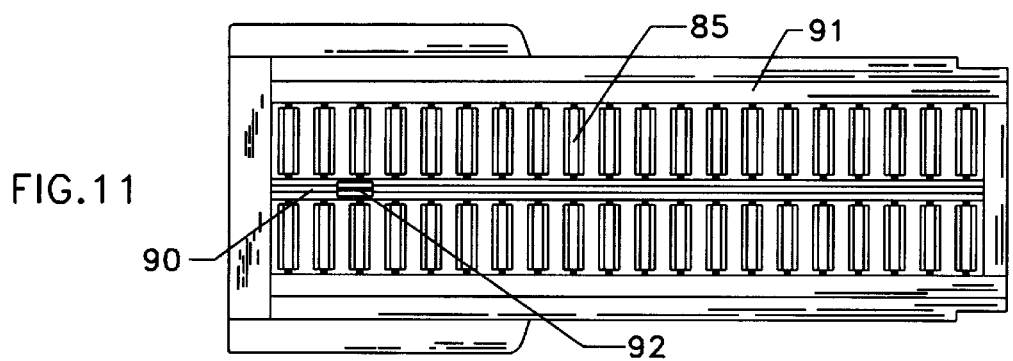

FIG. 11 shows a central support member 90 that supports rollers 85 on each side and contains a pulling system 92 for loading and unloading items from the ramp. FIG. 12 shows a similar ramp but with the deck planks oriented in a transverse position.

FIG. 13 shows a ramp with widened aft end 80A. Winch 110 is shown with protective housing 111 mounted on the forward end of the ramp.

FIGS. 14 thru 17 show a pulling system contained within the structure of the telescopic frame. Structural member 90 is slotted on its top surface providing a track for hub 92 to travel. Structural member 91 provides a container for a rod less cylinder 93 to reside. Member 91A may be used to keep the frame symmetrical but is not needed for the pulling system, however, it could be used to contain a system to move the telescopic frame relative to the pivoting frame replacing system 50 and 70. Member 90 may be fabricated on its sides to receive rollers 85. Sheaves 94 change the direction of the rod less cylinder's cable 95 allowing it to travel to and connect to hub 92. FIG. 15 shows the other end of the system and rod less cylinder 93A. FIG. 16 shows cable 95 being connected to hub 92 at 96.

FIG. 17 shows the incline of cable 95 from the rod less cylinder 93 to the hub 92. This provides for a less eccentric connection of the cable to the hub.

FIGS. 18 thru 25 show two methods for modifying the tailgates of pickup trucks having ramps. One method hinges the tailgate from the telescopic frame. Original tailgate 120 is modified by removing its lower section 121 and inserting hinge rod 123 vertically in one side of the new tailgate 122. A socket 123A is fabricated in the telescopic frame for rotationally receiving hinge rod 123. Locking rod 126, topped by knob 124, is slidably inserted in the other side of the new tailgate. A socket 125A is fabricated in the telescopic frame for receiving locking rod 125. The opened tailgate 122A can be lifted out of its socket if desired.

The other method hinges the tailgate from the sidewall of the vehicle. Original tailgate 130 is modified by removing its lower section 131 and 131A if desired and inserting hinge rod 133 vertically in one side of the new tailgate 132. Hinge brackets 134 are attached to the sidewall 16 of the vehicle for receiving hinge rod 133. Locking rod 136, topped by knob 135, is slidably inserted in the other side of the new tailgate A socket 136A is fabricated in the other sidewall for receiving locking rod 136. 132A shows the modified tailgate in an opened position.

SUMMARY, RAMIFICATIONS, AND SCOPE

Accordingly, the reader will see that the ramp of this invention can be efficiently used on a vehicle that has a flat cargo bed. That it is not necessary to locate and connect the lifting machinery to the vehicles main structural frame, rather just mount the entire system on the cargo bed. Four bolts through the deck are all that is needed for securing it. By locating the track rollers of the telescopic frame so that they travel inside the pivoting frame, rather than on top of it, the overall height of the system is reduced to a minimum. Furthermore, the ramp has the additional advantages in that, on vehicles having tailgates or rear doors it provides for a method for modifying the gates and doors so that the ramp can reside and operate under them;

on vehicles having wheel wells the ramp can reside and operate mesial the wheel wells and also allowing for the area aft of the wheel wells to be greater in width;

it allows for the ramp to be manufactured and marketed as a self contained package;

it incorporates the use of rectangular structural tubing in the design of the pivoting frame rails providing a track for the telescopic frame track rollers to travel in;

it provides for the top surface of the ramp to be a combination rolling and stationary devices and materials;

it provides for a compact pulling system which is located within the pivoting frame for loading and unloading cargo on and from the vehicle.

Although the description above contains many specificities, these should not be construed as limiting the scope of the invention but as merely providing illustrations of some of the presently preferred embodiments of this invention. For example, the lifting cylinders on the pivoting frame could be replaced by a single cylinder; the two base members could be joined by longitudinal members; tailgates could be hinged to raise vertically, etc.

Thus the scope of the invention should be determined by the appended claims and their legal equivalents, rather than by the examples given.

We claim:

1. An articulating telescopic ramp for mounting on top of the cargo bed of trucks, vans and trailers, comprising:

a base assembly having a forward end and a pivoting end and mounted on the top surface of said cargo bed, the forward end of the base assembly having means for attaching it approximate the forward end of said cargo bed and means for attaching lifting means to a raising end of a pivoting frame, the pivoting end of the base assembly having means for attaching it to the rear end of said cargo bed and means for pivotally attaching the pivoting frame to it;

said pivoting frame comprising longitudinal rails rigidly connected by transverse structural members providing means for a mated telescoping frame to traverse parallel to said pivoting frame, said raising end including means for attaching the lifting means between said pivoting frame and said forward end of said base assembly, a pivoting axis aft of said raising end, and an aft end, said pivoting frame being rotationally attached at its pivoting axis to said pivoting end of said base assembly, said pivoting frame having bearing means on which the telescoping frame is disposed and traverses;

said telescopic frame comprising longitudinal members rigidly connected by transverse structural members, having a forward end and a rear end with means for engaging said telescopic frame to said pivoting frame and bearing means for said telescopic frame to traverse longitudinally on and parallel to said pivoting frame and means for the rear end of said telescopic frame to cantilever beyond said aft end of said pivoting frame, and support means on which cargo is loaded;

said lifting means connected to said forward end of said base assembly and to said raising end of said pivoting frame for raising and lowering of said raising end of said pivoting frame providing the means for rotating said pivoting frame about said pivoting axis to a desired incline with the horizon;

extending and retracting means for extending and retracting said telescopic frame longitudinally parallel relative to said pivoting frame; and control means for actuating said lifting means and the extending and retracting means.

2. A ramp as defined in claim 1, wherein the trucks, vans, and trailers have wheel wells that protrude through and above their cargo beds, said pivoting frame and said telescopic frame having a width allowing them to freely reside within and traverse mesial the wheel wells.

3. A ramp as defined in claim 1, wherein said forward end of said base assembly and said means for attaching said lifting means on said raising end of said pivoting frame are located a distance aft of said forward end of said cargo bed allowing for said raising end of said pivoting frame to be absent of equipment thus providing cargo space forward of said lifting means.

4. A ramp as defined in claim 1, wherein said pivoting end of said base assembly is connected to the aft end of the structural frame on which said rear end of said cargo bed is mounted.

5. A ramp as defined in claim 1, wherein said pivoting end of said base assembly is connected to said rear end of said cargo bed and to the aft end of the structural frame on which said rear end of said cargo bed is mounted, the connection being accomplished by incorporating fastening means which interconnect said pivoting end of said base assembly, said rear end of said cargo bed and said aft end of said structural frame on which said rear end of said cargo bed is mounted.

6. A ramp as defined in claim 1, wherein said aft end of said pivoting frame extends a distance aft of said pivoting axis, thereby increasing the length of said ramp and allowing for said aft end of said pivoting frame to be lower than said pivoting axis when said raising end of said pivoting frame is raised.

7. A ramp as defined in claim 1, wherein the support means comprises a plurality of cylindrical conveyor rollers in combination with stationary deck material.

8. A ramp as defined in claim 1, wherein the longitudinal rails comprise mill sections of structural tubing having a slot cut in one side of each section for engaging traveling means disposed on said forward end of said telescopic frame allowing said telescopic frame to traverse longitudinally said pivoting frame.

9. A ramp as defined in claim 1, further including a linear actuator mounted longitudinally within the structure of said telescopic frame for pulling and pushing cargo on and off the support means.

10. A ramp as defined in claim 9, wherein said linear actuator comprises one of hydraulic or pneumatic rod less cylinders.

11. A ramp as defined in claim 1, wherein said extending and retracting means comprises a connecting means having two ends, one end of the connecting means attaches approximate the forward end of said telescopic frame, the other end attaches approximate the aft end of said telescopic frame, and a pulling means mounted on said pivoting frame pulls said connecting means in either direction, thus extending and retracting said telescopic frame.

12. A ramp as defined in claim 11, wherein said extending and retracting means comprises a linear actuator mounted longitudinally within the structure of said telescopic frame and having a traveling hub attached to said pivoting frame for extending and retracting said telescopic frame.

13. An articulating telescopic ramp for mounting on top of the cargo bed of trucks, vans and trailers having wheel wells that protrude through and above their cargo beds, comprising:

a base assembly having a forward end and a pivoting end and mounted on the top surface of said cargo bed, the forward end of the base assembly having means for attaching it approximate the forward end of said cargo bed and means for attaching lifting means to a raising end of a pivoting frame, the pivoting end of the base assembly having means for attaching it to the rear end of said cargo bed and means for pivotally attaching the pivoting frame to it;

said pivoting frame comprising longitudinal rails rigidly connected by transverse structural members having a width allowing it to freely reside within and traverse mesial the wheel wells providing means for a mated telescoping frame to traverse parallel to said pivoting frame, said raising end including means for attaching the lifting means between said pivoting frame and said forward end of said base assembly, a pivoting axis aft of said raising end, and an aft end, said pivoting frame being rotationally attached at its pivoting axis to said pivoting end of said base assembly, said pivoting frame having bearing means on which the telescoping frame is disposed and traverses;

said telescopic frame comprising longitudinal members rigidly connected by transverse structural members, having a forward end and a rear end with means for engaging said telescopic frame to said pivoting frame and bearing means for said telescopic frame to traverse longitudinally on and parallel to said pivoting frame and means for the rear end of said telescopic frame to cantilever beyond said aft end of said pivoting frame, and support means on which cargo is loaded;

said lifting means connected to said forward end of said base assembly and to said raising end of said pivoting frame for raising and lowering of said raising end of said pivoting frame providing the means for rotating said pivoting frame about said pivoting axis to a desired incline with the horizon;

extending and retracting means for extending and retracting said telescopic frame longitudinally parallel relative to said pivoting frame; and control means for actuating said lifting means and the extending and retracting means.

14. A ramp as defined in claim 13, wherein the section of said telescopic frame and said support means aft of said wheel wells is wider than that residing and forward of said wheel wells providing for an increase in the area of that section.

* * * * *